US012621696B2

(12) United States Patent
Chen et al.

(10) Patent No.: US 12,621,696 B2
(45) Date of Patent: May 5, 2026

(54) AVAILABILITY WINDOW ELEMENT FOR INDICATING AVAILABILITY WINDOWS FOR WLAN SENSING

(71) Applicant: Intel Corporation, Santa Clara, CA (US)

(72) Inventors: Cheng Chen, Camas, WA (US); Dibakar Das, Hillsboro, OR (US); Carlos Cordeiro, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/956,983

(22) Filed: Sep. 30, 2022

(65) Prior Publication Data

US 2023/0087820 A1     Mar. 23, 2023

(51) Int. Cl.
| *H04W 24/10* | (2009.01) |
| *H04W 52/02* | (2009.01) |
| *H04W 84/12* | (2009.01) |

(52) U.S. Cl.
CPC ....... *H04W 24/10* (2013.01); *H04W 52/0216* (2013.01); *H04W 84/12* (2013.01)

(58) Field of Classification Search
CPC .. H04W 24/10; H04W 52/0216; H04W 84/12
(Continued)

(56) References Cited

U.S. PATENT DOCUMENTS 10,567,990 B2 * 2/2020 Kim ..................... H04W 24/02
10,667,160 B2 * 5/2020 Bergström ...... H04W 36/00835
(Continued)

FOREIGN PATENT DOCUMENTS

| CN | 117812629 | 4/2024 |
| EP | 4346291 | 10/2025 |
| WO | 2018102247 | 6/2018 |

OTHER PUBLICATIONS

S. A. Golden and S. S. Bateman, "Sensor Measurements for Wi-Fi Location with Emphasis on Time-of-Arrival Ranging," in IEEE Transactions on Mobile Computing, vol. 6, No. 10, pp. 1185-1198, Oct. 2007. (Year: 2007).*

(Continued)

*Primary Examiner* — Melvin H Pollack
(74) *Attorney, Agent, or Firm* — Schwegman Lundberg & Woessner, P.A.

(57)     ABSTRACT

For wireless local area network (WLAN) sensing, a non-access point (AP) station (STA) sends a Measurement Setup Query frame to an access point station (AP) to signal one or more preferred time windows of the STA indicating when the STA is available to perform WLAN sensing with the AP. The STA receives a Measurement Setup Request frame received from the AP in response to the Measurement Setup Query frame. The Measurement Setup Request frame may indicate a time-window that is either within one of the preferred time-windows of the STA or a new proposed time-window that is not within one of the preferred time-windows of the STA. The STA may send a Measurement Setup Response frame to the AP to indicate an acceptance when the indicated time-window is within one of the preferred time-windows. The STA may send the Measurement Setup Response frame to indicate a rejection when the indicated time-window is not acceptable to the STA for performing the WLAN sensing procedure.

20 Claims, 6 Drawing Sheets

(58) Field of Classification Search
USPC ......................................................... 370/329
See application file for complete search history.

(56) References Cited

U.S. PATENT DOCUMENTS

| | | | | |
|---|---|---|---|---|
| 11,617,100 | B2 * | 3/2023 | Beg ...................... | H04W 8/005 |
| | | | | 370/338 |
| 11,743,860 | B2 * | 8/2023 | He ........................ | H04L 5/0091 |
| | | | | 370/329 |
| 11,950,202 | B2 * | 4/2024 | Omer ...................... | G01S 7/006 |
| 12,058,546 | B2 * | 8/2024 | Rugeland .......... | H04W 28/0278 |
| 12,075,473 | B2 * | 8/2024 | Sarkis .............. | H04W 74/0808 |
| 12,127,192 | B2 * | 10/2024 | Kim .................. | H04W 72/0446 |
| 12,144,012 | B2 * | 11/2024 | Xue ...................... | H04W 72/20 |
| 12,150,173 | B2 * | 11/2024 | Jang ...................... | H04L 5/0053 |
| 12,225,579 | B2 * | 2/2025 | Farag .................. | H04W 72/542 |
| 12,250,631 | B2 * | 3/2025 | Lim ........................ | H04B 17/24 |
| 12,316,397 | B2 * | 5/2025 | Ganju .................. | H04W 4/024 |
| 12,432,695 | B2 * | 9/2025 | Li ........................ | H04B 17/318 |
| 12,439,288 | B2 * | 10/2025 | Au ...................... | H04L 27/2647 |
| 12,464,457 | B2 * | 11/2025 | Wei .................. | H04W 52/0216 |
| 2015/0264530 | A1 | 9/2015 | Prechner et al. | |
| 2019/0361108 | A1 | 11/2019 | Jiang et al. | |
| 2020/0374736 | A1 * | 11/2020 | Fukuta .................. | H04W 24/08 |
| 2022/0330146 | A1 * | 10/2022 | Kanamarlapudi .... | H04W 76/28 |
| 2024/0357343 | A1 * | 10/2024 | Zorgui .................... | G01S 7/006 |
| 2025/0023700 | A1 * | 1/2025 | Shreevastav .......... | H04L 5/0094 |
| 2025/0056271 | A1 * | 2/2025 | Lim ...................... | H04W 24/08 |
| 2025/0093487 | A1 * | 3/2025 | Walker .................. | G01S 13/003 |
| 2025/0097957 | A1 * | 3/2025 | Guo ...................... | H04W 72/40 |
| 2025/0113229 | A1 * | 4/2025 | Kim ...................... | G01S 13/765 |
| 2025/0133430 | A1 * | 4/2025 | Jang ...................... | H04W 48/16 |
| 2025/0159440 | A1 * | 5/2025 | Dong .................... | H04W 24/10 |
| 2025/0175837 | A1 * | 5/2025 | Dong .................... | H04W 76/11 |
| 2025/0176019 | A1 * | 5/2025 | Beg ...................... | H04W 24/10 |
| 2025/0185057 | A1 * | 6/2025 | Dong .................... | H04W 24/10 |
| 2025/0227530 | A1 * | 7/2025 | Dong .................... | H04W 24/02 |
| 2025/0301357 | A1 * | 9/2025 | Dong .................... | H04W 24/10 |
| 2025/0350971 | A1 * | 11/2025 | Lin ...................... | H04W 24/08 |

OTHER PUBLICATIONS

Ning Xu, et al. 2004. A wireless sensor network For structural monitoring. In Proceedings of the 2nd international conference on Embedded networked sensor systems (SenSys '04). Association for Computing Machinery, New York, NY, USA, 13-24. (Year: 2004).*

Nipendra Kayastha et al. "Smart grid sensor data collection, communication, and networking: a tutorial," Wireless Communications & Mobile Computing, vol. 14, Issue 11, Aug. 2014, pp. 1021-1112. (Year: 2014).*

C. Perera, A. Zaslavsky, C. H. Liu, M. Compton, P. Christen and D. Georgakopoulos, "Sensor Search Techniques for Sensing as a Service Architecture for the Internet of Things," in IEEE Sensors Journal, vol. 14, No. 2, pp. 406-420, Feb. 2014. (Year: 2014).*

"European Application Serial No. 23185768.1, Extended European Search Report mailed Feb. 14, 2024", 4 pgs.

"European Application Serial No. 23185768.1, Response filed Oct. 2, 2024 to Extended European Search Report mailed Feb. 14, 2024", 31 pgs.

"European Application Serial No. 23185768.1, Response to Intent to Grant filed Jun. 18, 2025", 16 pgs.

* cited by examiner

BSS

MEASUREMENT SETUP

SESSION SETUP

NDPA SOUNDING     TF SOUNDING

SESSION SETUP     REPORTING +
                  LTF SEC. UPDATE

AVAILABILITY WINDOW ELEMENT FOR INDICATING AVAILABILITY WINDOWS FOR WLAN SENSING

TECHNICAL FIELD

Embodiments pertain to wireless communications. Some embodiments pertain to wireless networks including wireless local area networks (WLANs) and Wi-Fi networks including networks operating in accordance with the IEEE 802.11 family of standards. Some embodiments relate to extremely high throughput (EHT) communications. Some embodiments pertain to WLAN sensing in accordance with draft standard IEEE P802.11bf.

BACKGROUND

WLAN sensing is the use of PHY and MAC features of IEEE 802.11 stations to obtain measurements that may be useful to estimate features such as range, velocity, and motion of objects in an area of interest. Measurements obtained with WLAN sensing may be used to enable applications such as presence detection and gesture classification. One issue with WLAN sensing is that access points do not always know when stations, particularly unassociated stations, are available to perform sensing measurements.

DETAILED DESCRIPTION

Figures 1, 2:
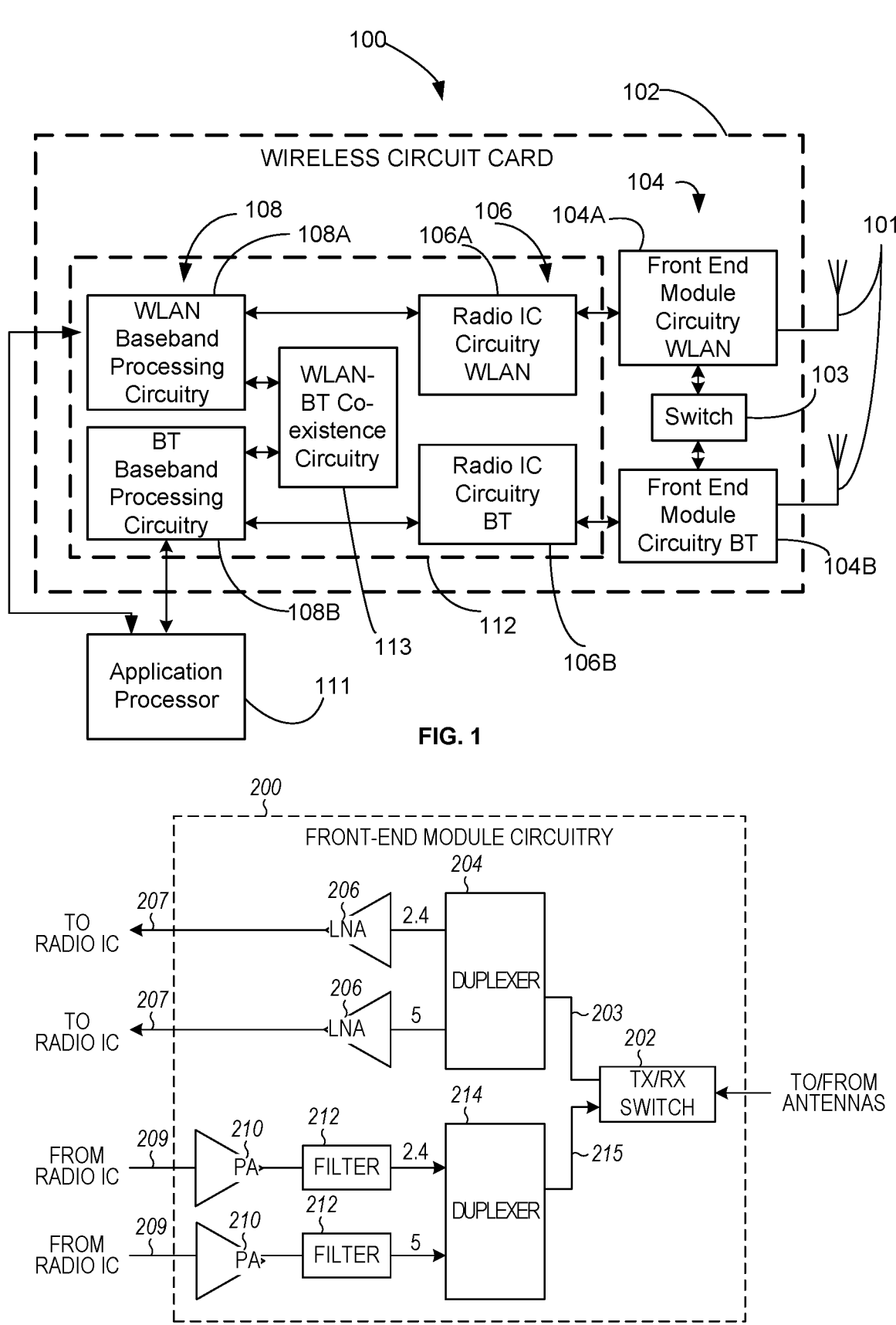
FIG. 1 is a block diagram of a radio architecture in accordance with some embodiments.
FIG. 2 illustrates a front-end module circuitry for use in the radio architecture of FIG. 1 in accordance with some embodiments.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Embodiments are directed to signalling availability periods for WLAN sensing. In some embodiments, for wireless local area network (WLAN) sensing, a non-access point (AP) station (STA) sends a Measurement Setup Query frame to an access point station (AP) to signal one or more preferred time windows of the STA indicating when the STA is available to perform WLAN sensing with the AP. The STA receives a Measurement Setup Request frame received from the AP in response to the Measurement Setup Query frame. The Measurement Setup Request frame may indicate a time-window that is either within one of the preferred time-windows of the STA or a new proposed time-window that is not within one of the preferred time-windows of the STA. The STA may send a Measurement Setup Response frame to the AP to indicate an acceptance when the indicated time-window is within one of the preferred time-windows. The STA may send the Measurement Setup Response frame to indicate a rejection when the indicated time-window is not acceptable to the STA for performing the WLAN sensing procedure. These embodiments are described in more detail below.

In some embodiments, for wireless local area network (WLAN) sensing, an access point (AP) station (AP) receives a Measurement Setup Query frame from an unassociated non-AP station (STA) that including one or more elements signaling one or more preferred time windows of the STA. The one or more preferred time-windows indicate when the STA is available to perform WLAN sensing with the AP. The AP may send a Measurement Setup Request frame for transmission to the STA in response to the Measurement Setup Query frame. The Measurement Setup Request frame may indicate a time-window either within one of the preferred time-windows of the STA or a new proposed time-window that is not within one of the preferred time-windows of the STA. The AP may receive a Measurement Setup Response frame from the STA in response to the Measurement Setup Request frame indicating an acceptance when the indicated time-window is within one of the preferred time-windows.

In these embodiments, when the AP is available to perform WLAN sensing within the one of the preferred time-windows of the STA, the AP may send the Measurement Setup Request frame to indicate a time-window within one of the preferred time-windows of the STA. When the AP is not available to perform WLAN sensing within the one of the preferred time-windows of the STA, the AP may send the Measurement Setup Request frame to indicate a proposed time-window for when the AP is available to perform WLAN sensing. These embodiments are described in more detail below.

FIG. 1 is a block diagram of a radio architecture 100 in accordance with some embodiments. Radio architecture 100 may include radio front-end module (FEM) circuitry 104, radio IC circuitry 106 and baseband processing circuitry 108. Radio architecture 100 as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 104 may include a WLAN or Wi-Fi FEM circuitry 104A and a Bluetooth (BT) FEM circuitry 104B. The WLAN FEM circuitry 104A may include a receive signal path comprising circuitry configured to operate on WLAN RF signals received from one or more antennas 101, to amplify the received signals and to provide the amplified versions of the received signals to the WLAN radio IC circuitry 106A for further processing. The BT FEM circuitry 104B may include a receive signal path which may include circuitry configured to operate on BT RF signals received from one or more antennas 101, to amplify the received signals and to provide the amplified versions of the received signals to the BT radio IC circuitry 106B for further processing. FEM circuitry 104A may also include a transmit signal path which may include circuitry configured to amplify WLAN signals provided by the radio IC circuitry 106A for wireless transmission by one or more of the antennas 101. In addition, FEM circuitry 104B may also include a transmit signal path which may include circuitry configured to amplify BT signals provided by the radio IC circuitry 106B for wireless transmission by the one or more antennas. In the embodiment of FIG. 1, although FEM 104A and FEM 104B are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 106 as shown may include WLAN radio IC circuitry 106A and BT radio IC circuitry 106B. The WLAN radio IC circuitry 106A may include a receive signal path which may include circuitry to down-convert WLAN RF signals received from the FEM circuitry 104A and provide baseband signals to WLAN baseband processing circuitry 108A. BT radio IC circuitry 106B may in turn include a receive signal path which may include circuitry to down-convert BT RF signals received from the FEM circuitry 104B and provide baseband signals to BT baseband processing circuitry 108B. WLAN radio IC circuitry 106A may also include a transmit signal path which may include circuitry to up-convert WLAN baseband signals provided by the WLAN baseband processing circuitry 108A and provide WLAN RF output signals to the FEM circuitry 104A for subsequent wireless transmission by the one or more antennas 101. BT radio IC circuitry 106B may also include a transmit signal path which may include circuitry to up-convert BT baseband signals provided by the BT baseband processing circuitry 108B and provide BT RF output signals to the FEM circuitry 104B for subsequent wireless transmission by the one or more antennas 101. In the embodiment of FIG. 1, although radio IC circuitries 106A and 106B are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 108 may include a WLAN baseband processing circuitry 108A and a BT baseband processing circuitry 108B. The WLAN baseband processing circuitry 108A may include a memory, such as, for example, a set of RAM arrays in a Fast Fourier Transform or Inverse Fast Fourier Transform block (not shown) of the WLAN baseband processing circuitry 108A. Each of the WLAN baseband circuitry 108A and the BT baseband circuitry 108B may further include one or more processors and control logic to process the signals received from the corresponding WLAN or BT receive signal path of the radio IC circuitry 106, and to also generate corresponding WLAN or BT baseband signals for the transmit signal path of the radio IC circuitry 106. Each of the baseband processing circuitries 108A and 108B may further include physical layer (PHY) and medium access control layer (MAC) circuitry and may further interface with application processor 111 for generation and processing of the baseband signals and for controlling operations of the radio IC circuitry 106.

Referring still to FIG. 1, according to the shown embodiment, WLAN-BT coexistence circuitry 113 may include logic providing an interface between the WLAN baseband circuitry 108A and the BT baseband circuitry 108B to enable use cases requiring WLAN and BT coexistence. In addition, a switch 103 may be provided between the WLAN FEM circuitry 104A and the BT FEM circuitry 104B to allow switching between the WLAN and BT radios according to application needs. In addition, although the antennas 101 are depicted as being respectively connected to the WLAN FEM circuitry 104A and the BT FEM circuitry 104B, embodiments include within their scope the sharing of one or more antennas as between the WLAN and BT FEMs, or the provision of more than one antenna connected to each of FEM 104A or 104B.

In some embodiments, the front-end module circuitry 104, the radio IC circuitry 106, and baseband processing circuitry 108 may be provided on a single radio card, such as wireless radio card 102. In some other embodiments, the one or more antennas 101, the FEM circuitry 104 and the radio IC circuitry 106 may be provided on a single radio card. In some other embodiments, the radio IC circuitry 106 and the baseband processing circuitry 108 may be provided on a single chip or integrated circuit (IC), such as IC 112.

In some embodiments, the wireless radio card 102 may include a WLAN radio card and may be configured for Wi-Fi communications, although the scope of the embodiments is not limited in this respect. In some of these embodiments, the radio architecture 100 may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal sub carriers.

In some of these multicarrier embodiments, radio architecture 100 may be part of a Wi-Fi communication station (STA) such as a wireless access point (AP), a base station or a mobile device including a Wi-Fi device. In some of these embodiments, radio architecture 100 may be configured to transmit and receive signals in accordance with specific communication standards and/or protocols, such as any of the Institute of Electrical and Electronics Engineers (IEEE) standards including, IEEE 802.11n-2009, IEEE 802.11-2012, IEEE 802.11-2016, IEEE 802.11ac, IEEE 802.11ax, and/or IEEE P802.11be standards and/or proposed specifications for WLANs, although the scope of embodiments is not limited in this respect. Radio architecture 100 may also be suitable to transmit and/or receive communications in accordance with other techniques and standards.

In some embodiments, the radio architecture 100 may be configured for high-efficiency (HE) Wi-Fi (HEW) communications in accordance with the IEEE 802.11ax standard. In some embodiments, the radio architecture 100 may be configured for Extremely High Throughput (EHT) communications in accordance with the IEEE 802.11be standard. In these embodiments, the radio architecture 100 may be configured to communicate in accordance with an OFDMA technique, although the scope of the embodiments is not limited in this respect. In some embodiments, the radio architecture 100 may be configured for next generation vehicle-to-everything (NGV) communications in accordance with the IEEE 802.11bd standard and one or more stations including AP 502 may be next generation vehicle-to-everything (NGV) stations (STAs).

In some other embodiments, the radio architecture 100 may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 1, the BT baseband circuitry 108B may be compliant with a Bluetooth (BT) connectivity standard such as Bluetooth, Bluetooth 4.0 or Bluetooth 5.0, or any other iteration of the Bluetooth Standard. In embodiments that include BT functionality as shown for example in FIG. 1, the radio architecture 100 may be configured to establish a BT synchronous connection oriented (SCO) link and/or a BT low energy (BT LE) link. In some of the embodiments that include functionality, the radio architecture 100 may be configured to establish an extended SCO (eSCO) link for BT communications, although the scope of the embodiments is not limited in this respect. In some of these embodiments that include a BT functionality, the radio architecture may be configured to engage in a BT Asynchronous Connection-Less (ACL) communications, although the scope of the embodiments is not limited in this respect. In some embodiments, as shown in FIG. 1, the functions of a BT radio card and WLAN radio card may be combined on a single wireless radio card, such as single wireless radio card 102, although embodiments are not so limited, and include within their scope discrete WLAN and BT radio cards.

In some embodiments, the radio-architecture 100 may include other radio cards, such as a cellular radio card configured for cellular (e.g., 3GPP such as LTE, LTE-Advanced or 5G communications).

In some IEEE 802.11 embodiments, the radio architecture 100 may be configured for communication over various channel bandwidths including bandwidths having center frequencies of about 900 MHz, 2.4 GHz, 5 GHz, and bandwidths of about 1 MHz, 2 MHz, 2.5 MHz, 4 MHz, 5 MHz, 8 MHz, 10 MHz, 16 MHz, 20 MHz, 40 MHz, 80 MHz (with contiguous bandwidths) or 80+80 MHz (160 MHz) (with non-contiguous bandwidths). In some embodiments, a 320 MHz channel bandwidth may be used. The scope of the embodiments is not limited with respect to the above center frequencies however.

FIG. 2 illustrates FEM circuitry 200 in accordance with some embodiments. The FEM circuitry 200 is one example of circuitry that may be suitable for use as the WLAN and/or BT FEM circuitry 104A/104B (FIG. 1), although other circuitry configurations may also be suitable.

In some embodiments, the FEM circuitry 200 may include a TX/RX switch 202 to switch between transmit mode and receive mode operation. The FEM circuitry 200 may include a receive signal path and a transmit signal path. The receive signal path of the FEM circuitry 200 may include a low-noise amplifier (LNA) 206 to amplify received RF signals 203 and provide the amplified received RF signals 207 as an output (e.g., to the radio IC circuitry 106 (FIG. 1)). The transmit signal path of the circuitry 200 may include a power amplifier (PA) to amplify input RF signals 209 (e.g., provided by the radio IC circuitry 106), and one or more filters 212, such as band-pass filters (BPFs), low-pass filters (LPFs) or other types of filters, to generate RF signals 215 for subsequent transmission (e.g., by one or more of the antennas 101 (FIG. 1)).

In some dual-mode embodiments for Wi-Fi communication, the FEM circuitry 200 may be configured to operate in either the 2.4 GHz frequency spectrum or the 5 GHz frequency spectrum. In these embodiments, the receive signal path of the FEM circuitry 200 may include a receive signal path duplexer 204 to separate the signals from each spectrum as well as provide a separate LNA 206 for each spectrum as shown. In these embodiments, the transmit signal path of the FEM circuitry 200 may also include a power amplifier 210 and a filter 212, such as a BPF, a LPF or another type of filter for each frequency spectrum and a transmit signal path duplexer 214 to provide the signals of one of the different spectrums onto a single transmit path for subsequent transmission by the one or more of the antennas 101 (FIG. 1). In some embodiments, BT communications may utilize the 2.4 GHZ signal paths and may utilize the same FEM circuitry 200 as the one used for WLAN communications.

Figure 3:
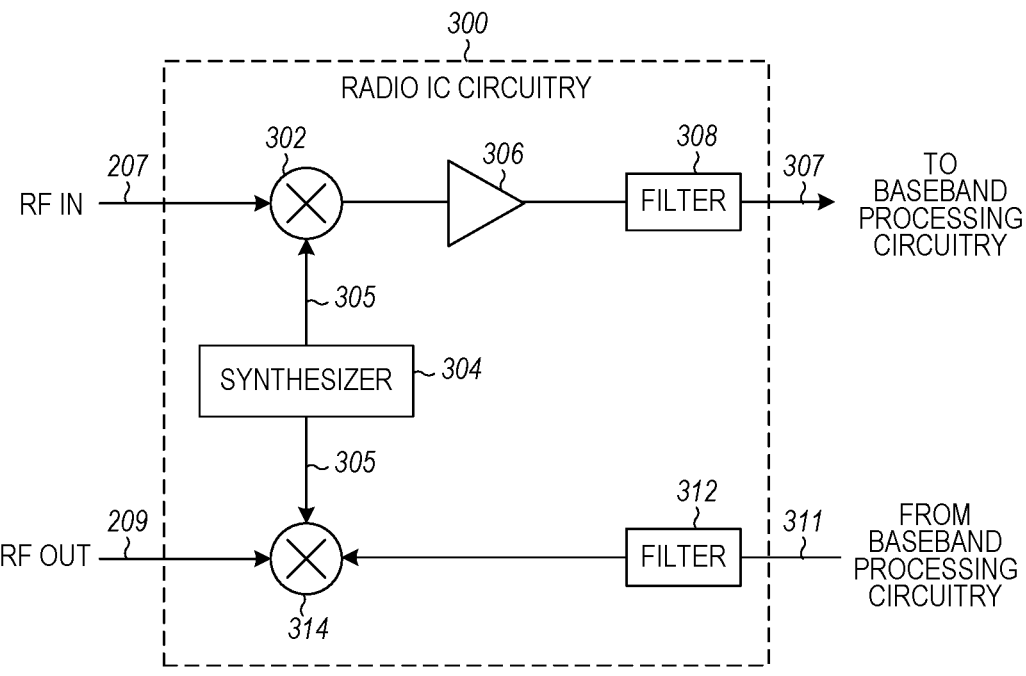
FIG. 3 illustrates a radio IC circuitry for use in the radio architecture of FIG. 1 in accordance with some embodiments.

FIG. 3 illustrates radio IC circuitry 300 in accordance with some embodiments. The radio IC circuitry 300 is one example of circuitry that may be suitable for use as the WLAN or BT radio IC circuitry 106A/106B (FIG. 1), although other circuitry configurations may also be suitable.

In some embodiments, the radio IC circuitry 300 may include a receive signal path and a transmit signal path. The receive signal path of the radio IC circuitry 300 may include at least mixer circuitry 302, such as, for example, down-conversion mixer circuitry, amplifier circuitry 306 and filter circuitry 308. The transmit signal path of the radio IC circuitry 300 may include at least filter circuitry 312 and mixer circuitry 314, such as, for example, up-conversion mixer circuitry. Radio IC circuitry 300 may also include synthesizer circuitry 304 for synthesizing a frequency 305 for use by the mixer circuitry 302 and the mixer circuitry 314. The mixer circuitry 302 and/or 314 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 3 illustrates only a simplified version of a radio IC circuitry, and may include, although not shown, embodiments where each of the depicted circuitries may include more than one component. For instance, mixer circuitry 320 and/or 314 may each include one or more mixers, and filter circuitries 308 and/or 312 may each include one or more filters, such as one or more BPFs and/or LPFs according to application needs. For example, when mixer circuitries are of the direct-conversion type, they may each include two or more mixers.

In some embodiments, mixer circuitry 302 may be configured to down-convert RF signals 207 received from the FEM circuitry 104 (FIG. 1) based on the synthesized frequency 305 provided by synthesizer circuitry 304. The amplifier circuitry 306 may be configured to amplify the down-converted signals and the filter circuitry 308 may include a LPF configured to remove unwanted signals from the down-converted signals to generate output baseband signals 307. Output baseband signals 307 may be provided to the baseband processing circuitry 108 (FIG. 1) for further processing. In some embodiments, the output baseband signals 307 may be zero-frequency baseband signals, although this is not a requirement. In some embodiments, mixer circuitry 302 may comprise passive mixers, although the scope of the embodiments is not limited in this respect.

In some embodiments, the mixer circuitry 314 may be configured to up-convert input baseband signals 311 based on the synthesized frequency 305 provided by the synthesizer circuitry 304 to generate RF output signals 209 for the FEM circuitry 104. The baseband signals 311 may be provided by the baseband processing circuitry 108 and may be filtered by filter circuitry 312. The filter circuitry 312 may include a LPF or a BPF, although the scope of the embodiments is not limited in this respect.

In some embodiments, the mixer circuitry 302 and the mixer circuitry 314 may each include two or more mixers and may be arranged for quadrature down-conversion and/or up-conversion respectively with the help of synthesizer 304. In some embodiments, the mixer circuitry 302 and the mixer circuitry 314 may each include two or more mixers each configured for image rejection (e.g., Hartley image rejection). In some embodiments, the mixer circuitry 302 and the mixer circuitry 314 may be arranged for direct down-conversion and/or direct up-conversion, respectively. In some embodiments, the mixer circuitry 302 and the mixer circuitry 314 may be configured for super-heterodyne operation, although this is not a requirement.

Mixer circuitry 302 may comprise, according to one embodiment: quadrature passive mixers (e.g., for the in-phase (I) and quadrature phase (Q) paths). In such an embodiment, RF input signal 207 from FIG. 3 may be down-converted to provide I and Q baseband output signals to be sent to the baseband processor Quadrature passive mixers may be driven by zero and ninety-degree time-varying LO switching signals provided by a quadrature circuitry which may be configured to receive a LO frequency ($f_{LO}$) from a local oscillator or a synthesizer, such as LO frequency 305 of synthesizer 304 (FIG. 3). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have a 25% duty cycle and a 50% offset. In some embodiments, each branch of the mixer circuitry (e.g., the in-phase (I) and quadrature phase (Q) path) may operate at a 25% duty cycle, which may result in a significant reduction is power consumption.

The RF input signal 207 (FIG. 2) may comprise a balanced signal, although the scope of the embodiments is not limited in this respect. The I and Q baseband output signals may be provided to low-nose amplifier, such as amplifier circuitry 306 (FIG. 3) or to filter circuitry 308 (FIG. 3).

In some embodiments, the output baseband signals 307 and the input baseband signals 311 may be analog baseband signals, although the scope of the embodiments is not limited in this respect. In some alternate embodiments, the output baseband signals 307 and the input baseband signals 311 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 304 may be a fractional-N synthesizer or a fractional N/N+1 synthesizer, although the scope of the embodiments is not limited in this respect as other types of frequency synthesizers may be suitable. For example, synthesizer circuitry 304 may be a delta-sigma synthesizer, a frequency multiplier, or a synthesizer comprising a phase-locked loop with a frequency divider. According to some embodiments, the synthesizer circuitry 304 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuitry 304 may be provided by a voltage controlled oscillator (VCO), although that is not a requirement. A divider control input may further be provided by either the baseband processing circuitry 108 (FIG. 1) or application processor 111 (FIG. 1) depending on the desired output frequency 305. In some embodiments, a divider control input (e.g., N) may be determined from a look-up table (e.g., within a Wi-Fi card) based on a channel number and a channel center frequency as determined or indicated by application processor 111.

In some embodiments, synthesizer circuitry 304 may be configured to generate a carrier frequency as the output frequency 305, while in other embodiments, the output frequency 305 may be a fraction of the carrier frequency (e.g., one-half the carrier frequency, one-third the carrier frequency). In some embodiments, the output frequency 305 may be a LO frequency ($f_{LO}$).

Figure 4:
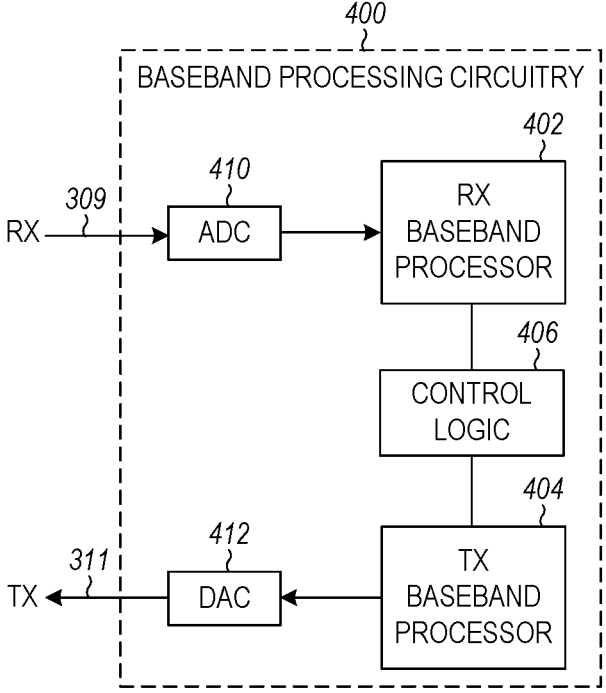
FIG. 4 illustrates a baseband processing circuitry for use in the radio architecture of FIG. 1 in accordance with some embodiments.

FIG. 4 illustrates a functional block diagram of baseband processing circuitry 400 in accordance with some embodiments. The baseband processing circuitry 400 is one example of circuitry that may be suitable for use as the baseband processing circuitry 108 (FIG. 1), although other circuitry configurations may also be suitable. The baseband processing circuitry 400 may include a receive baseband processor (RX BBP) 402 for processing receive baseband signals 309 provided by the radio IC circuitry 106 (FIG. 1) and a transmit baseband processor (TX BBP) 404 for generating transmit baseband signals 311 for the radio IC circuitry 106. The baseband processing circuitry 400 may also include control logic 406 for coordinating the operations of the baseband processing circuitry 400.

In some embodiments (e.g., when analog baseband signals are exchanged between the baseband processing circuitry 400 and the radio IC circuitry 106), the baseband processing circuitry 400 may include ADC 410 to convert analog baseband signals received from the radio IC circuitry 106 to digital baseband signals for processing by the RX BBP 402. In these embodiments, the baseband processing circuitry 400 may also include DAC 412 to convert digital baseband signals from the TX BBP 404 to analog baseband signals.

In some embodiments that communicate OFDM signals or OFDMA signals, such as through baseband processor 108A, the transmit baseband processor 404 may be configured to generate OFDM or OFDMA signals as appropriate for transmission by performing an inverse fast Fourier transform (IFFT). The receive baseband processor 402 may be configured to process received OFDM signals or OFDMA signals by performing an FFT. In some embodiments, the receive baseband processor 402 may be configured to detect the presence of an OFDM signal or OFDMA signal by performing an autocorrelation, to detect a pre-amble, such as a short preamble, and by performing a cross-correlation, to detect a long preamble. The preambles may be part of a predetermined frame structure for Wi-Fi communication.

Referring back to FIG. 1, in some embodiments, the antennas 101 (FIG. 1) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 101 may each include a set of phased-array antennas, although embodiments are not so limited.

Although the radio-architecture 100 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Figure 5:
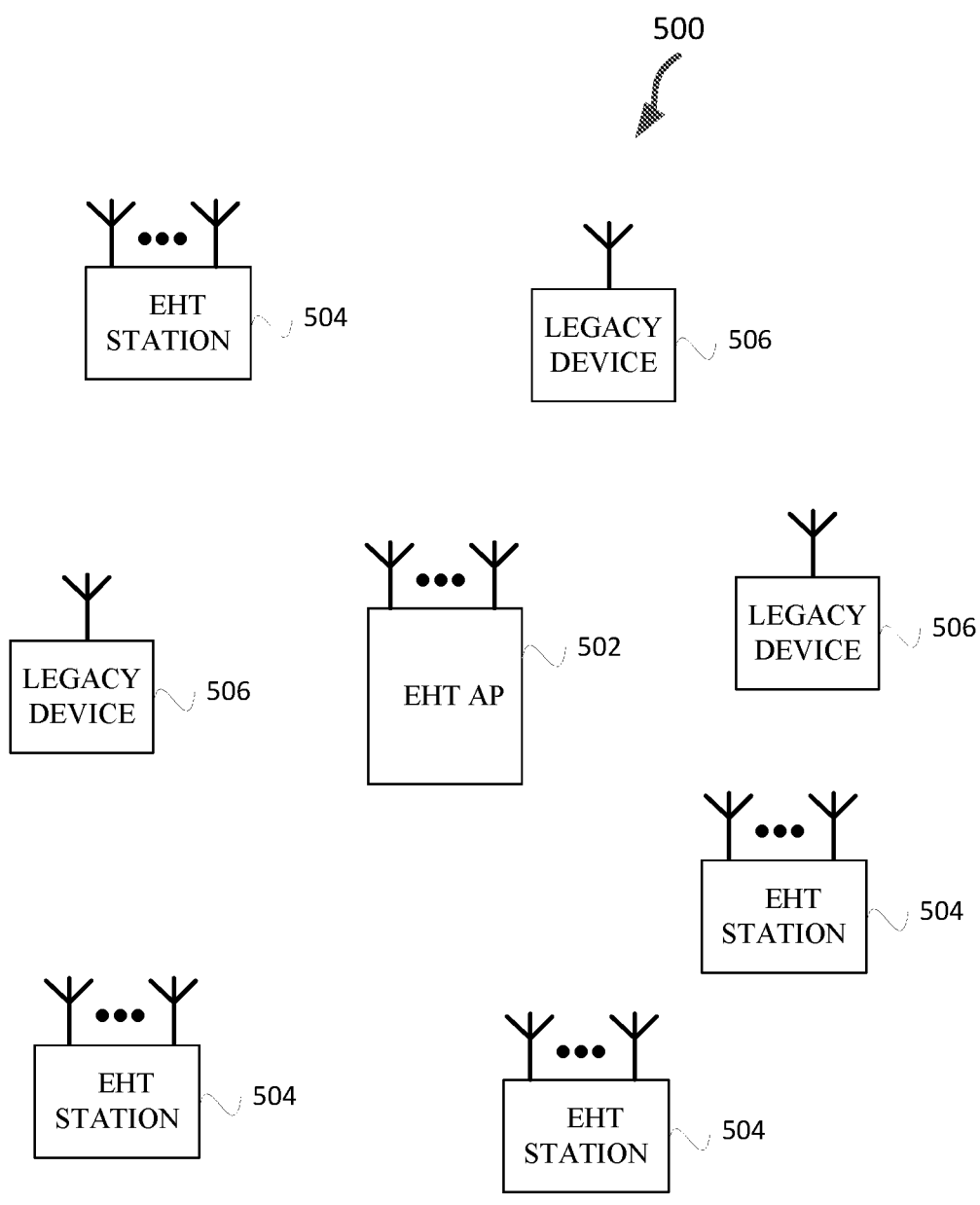
FIG. 5 illustrates a WLAN in accordance with some embodiments.

FIG. 5 illustrates a WLAN 500 in accordance with some embodiments. The WLAN 500 may comprise a basis service set (BSS) that may include an access point (AP) 502, which may be an AP, a plurality of stations 504, and a plurality of legacy (e.g., IEEE 802.11n/ac/ax) devices 506. In some embodiments, WLAN 500 may be configured for Extremely High Throughput (EHT) communications in accordance with the IEEE 802.11be standard and one or more stations including AP 502 may be EHT STAs. In some embodiments, WLAN 500 may be configured for next generation vehicle-to-everything (NGV) communications in accordance with the IEEE 802.11bd standard and one or more stations including AP 502 may be next generation vehicle-to-everything (NGV) stations (STAs).

The AP 502 may be an AP using the IEEE 802.11 to transmit and receive. The AP 502 may be a base station. The AP 502 may use other communications protocols as well as the IEEE 802.11 protocol. The IEEE 802.11 protocol may be IEEE 802.11ax. The IEEE 802.11 protocol may include using orthogonal frequency division multiple-access (OFDMA), time division multiple access (TDMA), and/or code division multiple access (CDMA). The IEEE 802.11 protocol may include a multiple access technique. For example, the IEEE 802.11 protocol may include space-division multiple access (SDMA) and/or multiple-user multiple-input multiple-output (MU-MIMO). There may be more than one AP 502 that is part of an extended service set (ESS). A controller (not illustrated) may store information that is common to the more than one APs 502. IEEE P802.11be/D2.0, May 2022 is incorporated herein by reference.

The legacy devices 506 may operate in accordance with one or more of IEEE 802.11 a/b/g/n/ac/ad/af/ah/aj/ay, or another legacy wireless communication standard. The legacy devices 506 may be STAs or IEEE STAs. The STAs 504 may be wireless transmit and receive devices such as cellular telephone, portable electronic wireless communication devices, smart telephone, handheld wireless device, wireless glasses, wireless watch, wireless personal device, tablet, or another device that may be transmitting and receiving using the IEEE 802.11 protocol such as IEEE 802.11ax or another wireless protocol. In some embodiments, the STAs 504 may be termed high efficiency (HE) stations.

AP 502 may communicate with legacy devices 506 in accordance with legacy IEEE 802.11 communication techniques. In example embodiments, AP 502 may also be configured to communicate with STAs 504 in accordance with legacy IEEE 802.11 communication techniques.

In some embodiments, a frame may be configurable to have the same bandwidth as a channel. The frame may be a physical Layer Convergence Procedure (PLCP) Protocol Data Unit (PPDU). In some embodiments, there may be different types of PPDUs that may have different fields and different physical layers and/or different media access control (MAC) layers.

The bandwidth of a channel may be 20 MHz, 40 MHz, or 80 MHz, 160 MHz, 320 MHz contiguous bandwidths or an 80+80 MHz (160 MHz) non-contiguous bandwidth. In some embodiments, the bandwidth of a channel may be 1 MHz, 1.25 MHz, 2.03 MHz, 2.5 MHz, 4.06 MHz, 5 MHz and 10 MHz, or a combination thereof or another bandwidth that is less or equal to the available bandwidth may also be used. In some embodiments the bandwidth of the channels may be based on a number of active data subcarriers. In some embodiments the bandwidth of the channels is based on 26, 52, 106, 242, 484, 996, or 2×996 active data subcarriers or tones that are spaced by 20 MHz. In some embodiments the bandwidth of the channels is 256 tones spaced by 20 MHz. In some embodiments the channels are multiple of 26 tones or a multiple of 20 MHz. In some embodiments a 20 MHz channel may comprise 242 active data subcarriers or tones, which may determine the size of a Fast Fourier Transform (FFT). An allocation of a bandwidth or a number of tones or sub-carriers may be termed a resource unit (RU) allocation in accordance with some embodiments.

In some embodiments, the 26-subcarrier RU and 52-subcarrier RU are used in the 20 MHz, 40 MHz, 80 MHz, 160 MHz and 80+80 MHz OFDMA PPDU formats. In some embodiments, the 106-subcarrier RU is used in the 20 MHz, 40 MHz, 80 MHz, 160 MHz and 80+80 MHz OFDMA and MU-MIMO PPDU formats. In some embodiments, the 242-subcarrier RU is used in the 40 MHz, 80 MHz, 160 MHz and 80+80 MHz OFDMA and MU-MIMO PPDU formats. In some embodiments, the 484-subcarrier RU is used in the 80 MHz, 160 MHz and 80+80 MHz OFDMA and MU-MIMO PPDU formats. In some embodiments, the 996-subcarrier RU is used in the 160 MHz and 80+80 MHz OFDMA and MU-MIMO PPDU formats.

A frame may be configured for transmitting a number of spatial streams, which may be in accordance with MU-MIMO and may be in accordance with OFDMA. In other embodiments, AP 502, STA 504, and/or legacy device 506 may also implement different technologies such as code division multiple access (CDMA) 2000, CDMA 2000 1×, CDMA 2000 Evolution-Data Optimized (EV-DO), Interim Standard 2000 (IS-2000), Interim Standard 95 (IS-95), Interim Standard 856 (IS-856), Long Term Evolution (LTE), Global System for Mobile communications (GSM), Enhanced Data rates for GSM Evolution (EDGE), GSM EDGE (GERAN), IEEE 802.16 (i.e., Worldwide Interoperability for Microwave Access (WiMAX)), BlueTooth®, or other technologies.

Some embodiments relate to HE and/or EHT communications. In accordance with some IEEE 802.11 embodiments (e.g., IEEE 802.11ax embodiments) a AP 502 may operate as a master station which may be arranged to contend for a wireless medium (e.g., during a contention period) to receive exclusive control of the medium for an control period. In some embodiments, the control period may be termed a transmission opportunity (TXOP). AP 502 may transmit a master-sync transmission, which may be a trigger frame or control and schedule transmission, at the beginning of the control period. AP 502 may transmit a time duration of TXOP and sub-channel information. During the control period, STAs 504 may communicate with AP 502 in accordance with a non-contention based multiple access technique such as OFDMA or MU-MIMO. This is unlike conventional WLAN communications in which devices communicate in accordance with a contention-based communication technique, rather than a multiple access technique. During the control period, the AP 502 may communicate with STAs 504 using one or more frames. During the control period, the STAs 504 may operate on a sub-channel smaller than the operating range of the AP 502. During the control period, legacy stations refrain from communicating. The legacy stations may need to receive the communication from the AP 502 to defer from communicating.

In accordance with some embodiments, during TXOP the STAs 504 may contend for the wireless medium with the legacy devices 506 being excluded from contending for the wireless medium during the master-sync transmission. In some embodiments the trigger frame may indicate an uplink (UL) UL-MU-MIMO and/or UL OFDMA TXOP. In some embodiments, the trigger frame may include a DL UL-MU-MIMO and/or DL OFDMA with a schedule indicated in a preamble portion of trigger frame.

In some embodiments, the multiple-access technique used during the TXOP may be a scheduled OFDMA technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique. In some embodiments, the multiple access technique may be a Code division multiple access (CDMA).

The AP 502 may also communicate with legacy stations 506 and/or non-legacy stations 504 in accordance with legacy IEEE 802.11 communication techniques. In some embodiments, the AP 502 may also be configurable to communicate with STAs 504 outside the TXOP in accordance with legacy IEEE 802.11 communication techniques, although this is not a requirement.

In some embodiments station 504 may be a "group owner" (GO) for peer-to-peer modes of operation. A wireless device may be a Station 502 or a AP 502.

In some embodiments, the station 504 and/or AP 502 may be configured to operate in accordance with IEEE 802.11mc. In example embodiments, the radio architecture of FIG. 1 is configured to implement the station 504 and/or the AP 502. In example embodiments, the front-end module circuitry of FIG. 2 is configured to implement the station 504 and/or the AP 502. In example embodiments, the radio IC circuitry of FIG. 3 is configured to implement the station 504 and/or the AP 502. In example embodiments, the base-band processing circuitry of FIG. 4 is configured to implement the station 504 and/or the AP 502.

In example embodiments, the Stations 504, AP 502, an apparatus of the Stations 504, and/or an apparatus of the AP

502 may include one or more of the following: the radio architecture of FIG. 1, the front-end module circuitry of FIG. 2, the radio IC circuitry of FIG. 3, and/or the base-band processing circuitry of FIG. 4.

In example embodiments, the radio architecture of FIG. 1, the front-end module circuitry of FIG. 2, the radio IC circuitry of FIG. 3, and/or the base-band processing circuitry of FIG. 4 may be configured to perform the methods and operations/functions herein.

In example embodiments, the station 504 and/or the AP 502 are configured to perform the methods and operations/functions described herein. In example embodiments, an apparatus of the station 504 and/or an apparatus of the AP 502 are configured to perform the methods and functions described herein. The term Wi-Fi may refer to one or more of the IEEE 802.11 communication standards. AP and STA may refer to access point 502 and/or station 504 as well as legacy devices 506.

In some embodiments, a AP STA may refer to a AP 502 and a STAs 504 that is operating a APs 502. In some embodiments, when an STA 504 is not operating as a AP, it may be referred to as a non-AP STA or non-AP. In some embodiments, STA 504 may be referred to as either a AP STA or a non-AP.

Similar to 11az Ranging, 11bf sensing group has defined both Trigger based (TB) and non-TB sensing measurement sessions. In the former, an AP performs sensing with multiple STAs in a same measurement instance by leveraging UL-OFDMA and NDP-A. Clearly, for the mechanism to work, multiple STAs, which could be unassociated to an AP, need to be present at a similar time-window. This information needs to be conveyed to a STA during measurement setup.

Figure 6:
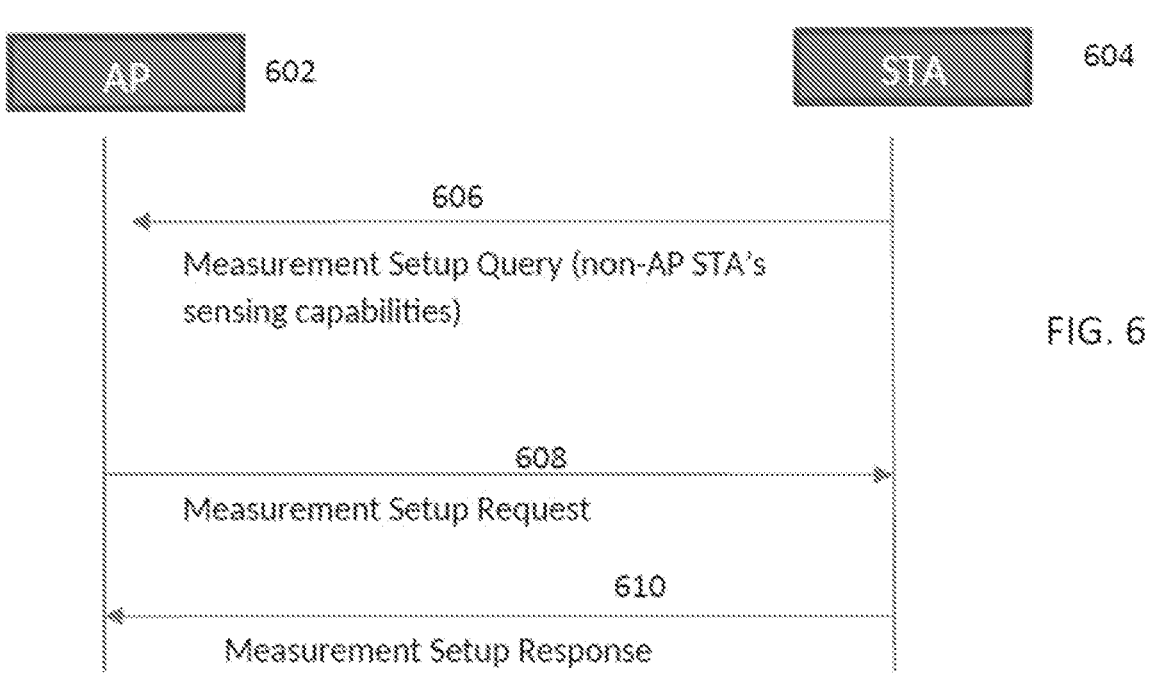
FIG. 6 illustrates a trigger-based (TB) measurement session setup sequence for WLAN sensing, in accordance with some embodiments.

FIG. 6 illustrates a trigger-based (TB) measurement session setup sequence for WLAN sensing, in accordance with some embodiments. FIG. 6 shows the likely measurement sequence to be used for TB Sensing for unassociated STAs. First, the non-AP STA 604 signals its presence and capability by transmitting a Measurement Setup Query frame 606. This step may be skipped if the STA is already associated to that AP 602. Then the AP 602 sends Measurement Setup Request frame 608 to the STA containing an UID for unassociated STA. This frame may contain the timing information that will inform the STA 604 about which time-window it shall use. Finally, the STA 604 indicates whether it accepts the measurement setup request in a Measurement Setup Response frame 610.

The current draft spec has not specified how an AP can efficiently arrive at a time-window schedule that works for the unassociated STA. In absence of such signaling the AP and STA would need to attempt many failed measurement setups before arriving at the right schedule costing power and increasing latency. Embodiments disclosed herein address this issue.

Figure 7:
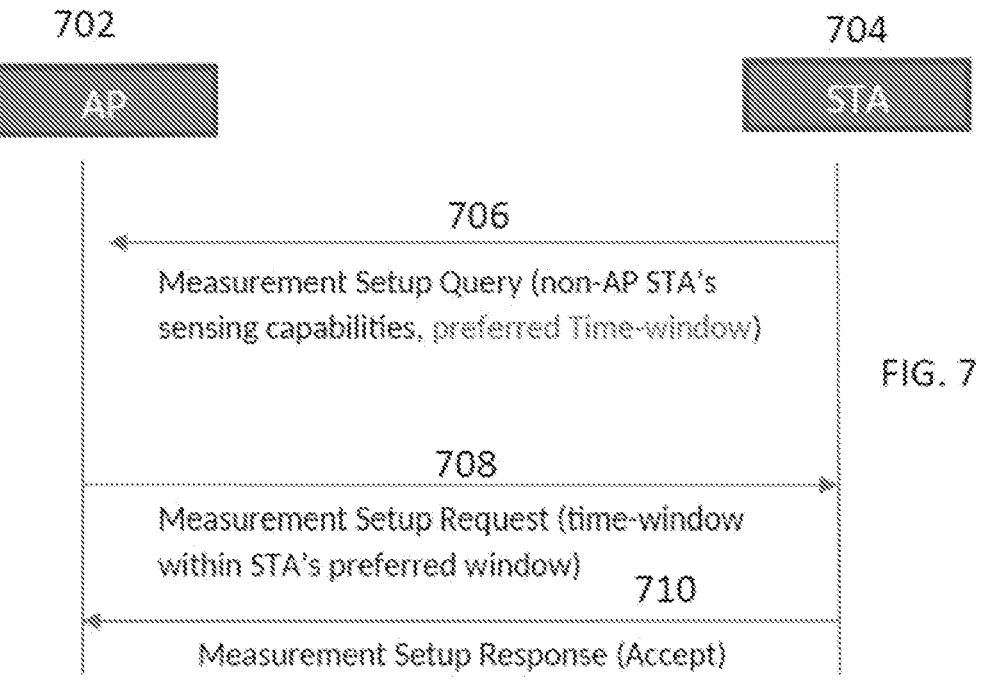
FIG. 7 illustrates a trigger-based (TB) measurement session setup sequence for WLAN sensing using preferred time-window signalling, in accordance with some embodiments.

FIG. 7 illustrates a trigger-based (TB) measurement session setup sequence for WLAN sensing using preferred time-window signalling, in accordance with some embodiments. In these embodiments, the unassociated STA signals its availability in the Measurement Setup Query, and the unassociated STA signals alternate availability schedule in the Measurement Setup Response when that frame indicates rejection. These embodiments allow an AP to be aware of STA's preference and limitations and calculate the right time-window for the latter. This is particularly beneficial for unassociated STAs because the AP has no idea of when the STA becomes available.

In some embodiments, the Measurement Setup Query frame sent by an unassociated STA contains one or more elements signaling its preferred availability window(s). In some embodiments, the Measurement Setup Response frame indicating a rejection may contain an element(s) signaling the preferred availability window. In some embodiments the element signaling the availability window information is a TWT element. The TWT Flow ID (if individual TWT) or the Broadcast TWT ID (if a Broadcast TWT element) fields may be reserved. In some embodiments the element signaling the availability window information is an ISTA Availability Window element. In some embodiments the element signaling the availability window information is an RSTA Availability Window element.

In some embodiments the STA may send a new Measurement Setup Query if its availability window information have has changed since the last time it signaled it. In some embodiments the STA may send a Measurement Setup Response frame signaling an Accept and an availability window that is different from what was sent in the Measurement Setup Request frame.

In some embodiments on reception of a Measurement Setup Response frame signaling rejection, the AP does not attempt to setup a TB measurement session with that STA using time-window parameters that are different from what was signaled by the STA. FIG. 7 shows an example of how an AP uses the preferred time-window information learnt from the non-AP STA to calculate the right time-window for TB measurement session setup with that STA.

The Sensing Measurement Setup Request frame is transmitted by a sensing initiator to request a sensing measurement setup. The Measurement Setup ID field in the Sensing Measurement Setup Request frame indicates a Measurement Setup ID that identifies assigned parameters in the Sensing Measurement Parameters Element to be used in the corresponding sensing measurement instances. The Sensing Measurement Setup Response frame is sent by a sensing responder in response to a Sensing Measurement Setup Request frame.

Some embodiments are directed to a non-access point (AP) station (STA) 704. In these embodiments, for wireless local area network (WLAN) sensing, the STA may be configured to encode a Measurement Setup Query frame 706 for transmission to an access point station (AP) 702. The Measurement Setup Query frame 706 may be encoded to include one or more elements signaling one or more preferred time windows of the STA. In these embodiments, the one or more preferred time-windows may indicate when the STA is available to perform WLAN sensing with the AP.

The STA may also be configured to decode a Measurement Setup Request frame 708 received from the AP. The Measurement Setup Request frame 708 may be received in response to the Measurement Setup Query frame. The Measurement Setup Request frame 708 may indicate a time-window that is either within one of the preferred time-windows of the STA or a new proposed time-window that is not within one of the preferred time-windows of the STA. In these embodiments, the STA 704 may encode a Measurement Setup Response frame 710 for transmission to the AP in response to the Measurement Setup Request frame 708. The Measurement Setup Response frame 710 may be encoded to indicate an acceptance when the indicated time-window is within one of the preferred time-windows.

In some embodiments, the STA may encode the Measurement Setup Response frame 710 to indicate a rejection when the indicated time-window is not acceptable to the STA for performing the WLAN sensing procedure (i.e., the STA is not available to perform WLAN sensing with the AP).

In some embodiments, when the Measurement Setup Response frame 710 is encoded to indicate a rejection, the STA may further encode the Measurement Setup Response frame 710 to include one or more alternate preferred time windows that are acceptable to the STA for performing the WLAN sensing procedure. In these embodiments, after the STA indicates one or more alternate preferred time windows in the Measurement Setup Response frame 710, the AP may respond with another Measurement Setup Request frame with an indicated time-window that may be within one of the alternate preferred time windows.

In some embodiments, the STA may be further configured to encode the Measurement Setup Query frame 706 to include sensing capabilities of the STA.

In some embodiments, the STA may also be configured to encode the Measurement Setup Query frame 706 for transmission to the AP when the STA is unassociated with the AP. In these embodiments, the Measurement Setup Request frame 708 received from the unassociated AP may include a user ID (UID) for the STA 704 assigned by the AP. In these embodiments, associated STAs may also signal their availability to the AP, however in some cases, associated STAs may not need to signal their availability to the AP as the AP may already know the availability of its associated STAs.

In some embodiments, the STA may be configured to encode the Measurement Setup Response frame 710 to indicate an acceptance when the indicated time-window is acceptable to the STA for performing the WLAN sensing (i.e., the STA is available).

In some embodiments, when the Measurement Setup Response frame 710 is encoded to indicated an acceptance, the STA may be configured to perform a trigger-based (TB) measurement session setup with the AP for performing a TB sensing measurement procedure with the AP during the indicated time-window (i.e., the time window indicated by the AP in the Measurement Setup Request frame 708 received from the AP). In these embodiments, when the Measurement Setup Response frame 710 indicated a rejection, the AP may refrain from attempting to set up a TB measurement session with the STA using time-window parameters that are different than the time-window parameters that were signaled by the STA.

Figure 9:
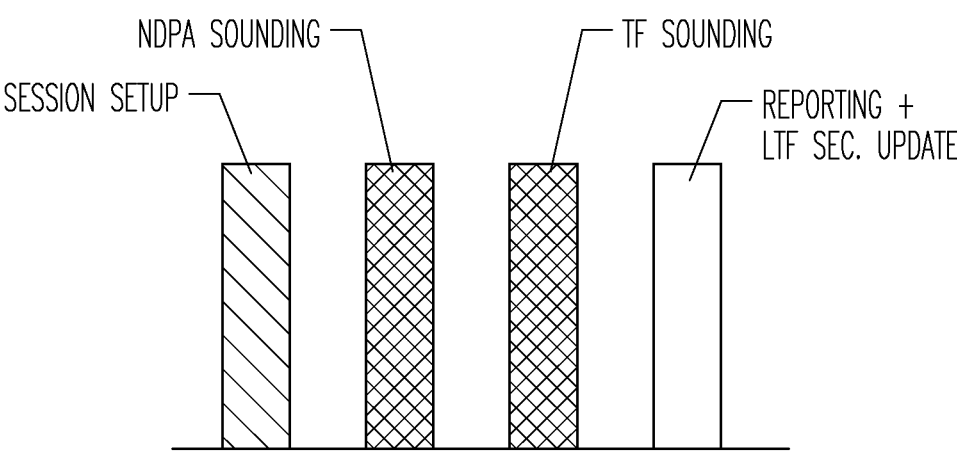
FIG. 9 illustrates an example of a trigger-based (TB) sensing measurement instance, in accordance with some embodiments.

In some embodiments, the TB sensing measurement procedure may comprise one or more phases including one or more of a Polling phase, a NDPA sounding phase, a Trigger frame (TF) sounding phase, and a reporting phase (see FIG. 9). In these embodiments, the AP may perform the TB sensing measurement procedure with the unassociated non-AP STA and one or more other non-AP stations including both associated and non-associated stations. In these embodiments, each the non-AP STA may synchronize its time-synchronization function (TSF) with the AP based on beacons of the AP, although the scope of the embodiments is not limited in this respect.

In some embodiments, the one or more elements encoded within the Measurement Setup Query frame 706 signaling one or more preferred time windows of the STA comprise a target-wakeup-time (TWT) element in which the TWT Flow ID field (if an individual TWT) or the Broadcast TWT ID (if a Broadcast TWT element) fields is reserved. In some embodiments, the one or more elements encoded within the Measurement Setup Query frame 706 signaling one or more preferred time windows of the STA comprise either an initiating station (ISTA) Availability Window Element or a responding station (RSTA) Availability Window Element.

In some embodiments, the memory of the STA may be configured to store indications of the one or more preferred time windows, and the processing circuitry comprises a baseband processor.

Some embodiments are directed to a non-transitory computer-readable storage medium that stores instructions for execution by processing circuitry of a non-access point (AP) station (STA) 704 configured for wireless local area network (WLAN) sensing.

Some embodiments are directed to an access point (AP) station (AP) 702. For wireless local area network (WLAN) sensing, the AP 702 may be configured to decode a Measurement Setup Query frame 706 received from an unassociated non-AP station (STA) 704. In these embodiments, the Measurement Setup Query frame 706 may include one or more elements signaling one or more preferred time windows of the STA indicating when the STA is available to perform WLAN sensing with the AP. In these embodiments, the AP may encode a Measurement Setup Request frame 708 for transmission to the STA.

The Measurement Setup Request frame 708 may be sent in response to the Measurement Setup Query frame. In these embodiments, the Measurement Setup Request frame 708 may indicate a time-window that is either within one of the preferred time-windows of the STA or a new proposed time-window that is not within one of the preferred time-windows of the STA. The AP may also decode a Measurement Setup Response frame 710 received from the STA in response to the Measurement Setup Request frame 708. The Measurement Setup Response frame 710 may indicate an acceptance when the indicated time-window is within one of the preferred time-windows.

In some embodiments, when the AP is available to perform WLAN sensing within the one of the preferred time-windows of the STA, the AP may encode the Measurement Setup Request frame 708 to indicate a time-window within one of the preferred time-windows of the STA. In these embodiments, when the AP is not available to perform WLAN sensing within the one of the preferred time-windows of the STA, the AP may encode the Measurement Setup Request frame 708 to indicate a proposed time-window for when the AP is available to perform WLAN sensing.

In some embodiments, the Measurement Setup Response frame 710 may indicate a rejection when the indicated time-window is not acceptable to the STA for performing the WLAN sensing procedure (i.e., the STA is not available to perform WLAN sensing with the AP). In some embodiments, when the Measurement Setup Response frame 710 indicates a rejection, the Measurement Setup Response frame 710 is expected to include one or more alternate preferred time windows that are acceptable to the STA for performing the WLAN sensing procedure.

Figure 8:
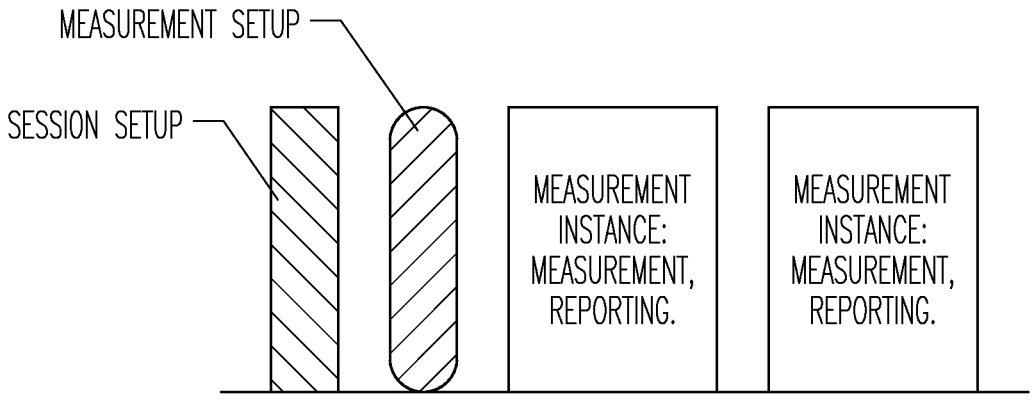
FIG. 8 illustrates an example of a WLAN sensing procedure, in accordance with some embodiments.

FIG. 8 illustrates an example of a WLAN sensing procedure, in accordance with some embodiments. The WLAN sensing procedure allows a STA to perform WLAN sensing. A WLAN sensing procedure is composed of one or more of the following: Sensing session setup, sensing measurement setup, sensing measurement instance(s), sensing measurement setup termination, and sensing session termination. In the sensing session setup, a sensing session is established, and in the sensing measurement setup, operational parameters associated with sensing measurement instance(s) are se. One or more sensing measurement setups may be established between a sensing initiator and a sensing responder. A sensing measurement instance is a time interval when sensing measurements are obtained, and it can be one of two variants: Trigger-based (TB) sensing measurement instance or non-TB sensing measurement instance. A sensing measurement instance is active until terminated in a sensing measurement setup termination. In the sensing session termination, a sensing session is terminated.

A STA acting as a sensing initiator may participate in a sensing measurement instance as a sensing transmitter, a sensing receiver, both a sensing transmitter and a sensing receiver, or neither a sensing transmitter nor a sensing receiver. A STA acting as a sensing responder may participate in a sensing measurement instance as a sensing transmitter, a sensing receiver, or both a sensing transmitter and a sensing receiver. Operational parameters associated with sensing measurement instance(s) are set in the sensing measurement setup. During WLAN sensing procedure, an associated non-AP STA is identified by its AID and an unassociated non-AP STA is identified by its unassociated STA identifier (USID). The USIDs are assigned to unassociated STAs during the sensing measurement setup exchange. The AID and USID assignment shall be nonconflicting and shall have the same size and valid range (as defined in the AID field). The USID usage shall follow the same rules as that of AIDs.

FIG. 9 illustrates an example of a trigger-based (TB) sensing measurement instance, in accordance with some embodiments. TB sensing measurement instance is the trigger-based variant of a sensing measurement instance. It is applicable to scenarios where an AP is the sensing initiator, and one or more non-AP STAs are the sensing responders. It includes one or more of the following phases: Polling phase, NDPA sounding phase, Trigger frame (TF) sounding phase, and reporting phase.

In some embodiments, a physical layer protocol data unit may be a physical layer conformance procedure (PLCP) protocol data unit (PPDU). In some embodiments, the AP and STAs may communicate in accordance with one of the IEEE 802.11 standards. IEEE 802.11-2016 is incorporated herein by reference. IEEE P802.11-REVmd/D2.4, August 2019, and IEEE draft specification IEEE P802.11ax/D5.0, October 2019 are incorporated herein by reference in their entireties. In some embodiments, the AP and STAs may be directional multi-gigabit (DMG) STAs or enhanced DMG (EDMG) STAs configured to communicate in accordance with IEEE 802.11ad standard or IEEE draft specification IEEE P802.11ay, February 2019, which is incorporated herein by reference. IEEE P802.11bf/D0.1, April 2022 is incorporated herein by reference.

Figure 10:
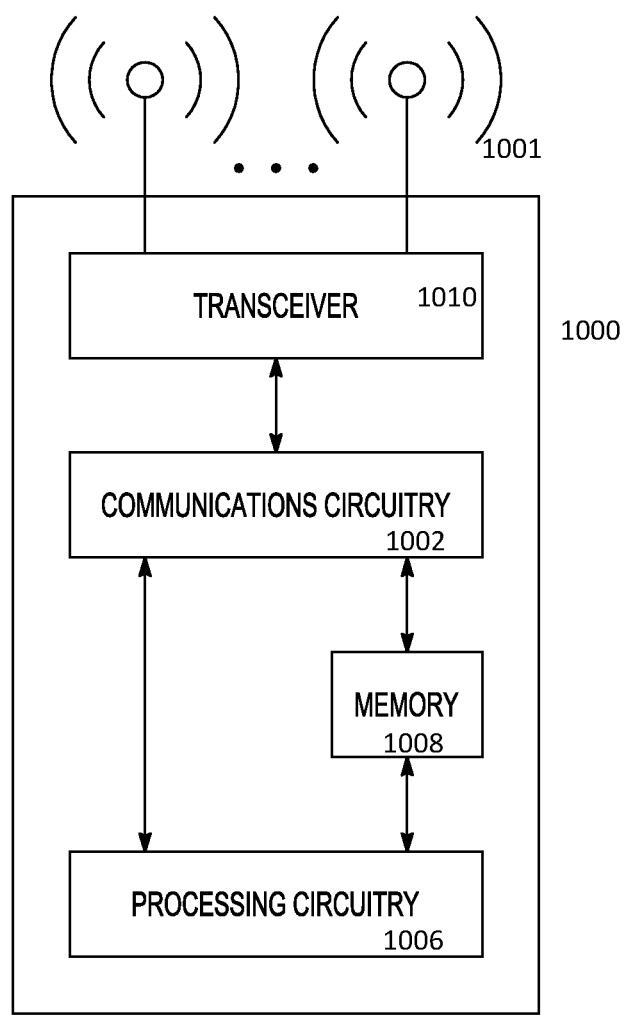
FIG. 10 illustrates a functional block diagram of a wireless communication device, in accordance with some embodiments.

FIG. 10 illustrates a functional block diagram of a wireless communication device, in accordance with some embodiments. In some embodiments, FIG. 10 illustrates a functional block diagram of a communication device (STA) that may be suitable for use as an AP STA, a non-AP STA or other user device in accordance with some embodiments. The communication device 1000 may also be suitable for use as a handheld device, a mobile device, a cellular telephone, a smartphone, a tablet, a netbook, a wireless terminal, a laptop computer, a wearable computer device, a femtocell, a high data rate (HDR) subscriber device, an access point, an access terminal, or other personal communication system (PCS) device.

The communication device 1000 may include communications circuitry 1002 and a transceiver 1010 for transmitting and receiving signals to and from other communication devices using one or more antennas 1001. The communications circuitry 1002 may include circuitry that can operate the physical layer (PHY) communications and/or medium access control (MAC) communications for controlling access to the wireless medium, and/or any other communications layers for transmitting and receiving signals. The communication device 1000 may also include processing circuitry 1006 and memory 1008 arranged to perform the operations described herein. In some embodiments, the communications circuitry 1002 and the processing circuitry 1006 may be configured to perform operations detailed in the above figures, diagrams, and flows.

In accordance with some embodiments, the communications circuitry 1002 may be arranged to contend for a wireless medium and configure frames or packets for communicating over the wireless medium. The communications circuitry 1002 may be arranged to transmit and receive signals. The communications circuitry 1002 may also include circuitry for modulation/demodulation, upconversion/downconversion, filtering, amplification, etc. In some embodiments, the processing circuitry 1006 of the communication device 1000 may include one or more processors. In other embodiments, two or more antennas 1001 may be coupled to the communications circuitry 1002 arranged for sending and receiving signals. The memory 1008 may store information for configuring the processing circuitry 1006 to perform operations for configuring and transmitting message frames and performing the various operations described herein. The memory 1008 may include any type of memory, including non-transitory memory, for storing information in a form readable by a machine (e.g., a computer). For example, the memory 1008 may include a computer-readable storage device, read-only memory (ROM), random-access memory (RAM), magnetic disk storage media, optical storage media, flash-memory devices and other storage devices and media.

In some embodiments, the communication device 1000 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication device 1000 may include one or more antennas 1001. The antennas 1001 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting device.

In some embodiments, the communication device 1000 may include one or more of a keyboard, a display, a non-volatile memory port, multiple antennas, a graphics processor, an application processor, speakers, and other mobile device elements. The display may be an LCD screen including a touch screen.

Although the communication device 1000 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication device 1000 may refer to one or more processes operating on one or more processing elements.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus for a non-access point station (STA), the apparatus comprising:
   processing circuitry; and memory, the STA configured to perform network (WLAN) sensing,
      wherein to participate in a sensing measurement setup initiated by an access point station (AP) that the STA is unassociated with, the processing circuitry is configured to:
      encode a Sensing Measurement Setup Query frame for transmission to the AP, the Measurement Setup Query frame encoded to include an initiating station (ISTA) Availability Window Element, the ISTA Availability Window Element encoded to indicate an availability window of the STA for trigger-based (TB) sensing and a preferred periodicity;
      decode a Sensing Measurement Setup Request frame received from the AP in response to the Sensing Measurement Setup Query frame;
      wherein for the TB sensing, the Sensing Measurement Setup Request frame includes a responding station (RSTA) Availability Window Element that indicates a requested availability window, the requested availability window based on the availability window and the preferred periodicity indicated in the ISTA Availability Window Element of the Sensing Measurement Setup Query frame, the Sensing Measurement Setup Request frame further including a Sensing Measurement Parameters Element indicating requested sensing measurement setup parameters for a sensing measurement instance;
      encode for transmission to the AP, a Sensing Measurement Setup Response frame in response to receipt of the Sensing Measurement Setup Request frame, the Sensing Measurement Setup Response frame encoded to indicate acceptance or rejection of the requested sensing measurement setup parameters in the Sensing Measurement Setup Request frame,
      wherein when the Sensing Measurement Setup Response frame is encoded to indicate rejection of the requested sensing measurement setup parameters, the processing circuitry is configured to encode the Sensing Measurement Setup Response frame to indicate preferred sensing measurement parameters;
      perform sensing measurements during a TB sensing measurement instance based on the sensing measurement setup parameters, the TB sensing measurement instance occurring within the sensing availability window; and estimate features of an object in an area of interest based on the sensing measurements performed during the TB sensing measurement instance.

2. The apparatus of claim 1, wherein the processing circuitry is further configured to encode the Measurement Setup Query frame to include sensing capabilities of the STA.

3. The apparatus of claim 2, wherein processing circuitry is configured to encode the Sensing Measurement Setup Response frame to indicate rejection when the Sensing Measurement Setup Request frame did not indicate an availability window that overlaps the availability window of the STA signaled by the ISTA Availability Window Element.

4. The apparatus of claim 3, wherein the Sensing Measurement Setup Response frame is encoded to indicate rejection because the Sensing Measurement Setup Request frame did not indicate an availability window that overlaps the availability window of the STA signaled by the ISTA Availability Window Element, the processing circuitry is further configured to encode the Sensing Measurement Setup Response frame to include an Availability Window Element that indicates one or more other availability windows that can be assigned by the AP.

5. The apparatus of claim 4, wherein the TB sensing measurement instance includes one or more of a polling phase, NDPA sounding phase, Trigger frame (TF) sounding phase, and reporting phase.

6. The apparatus of claim 5, wherein the features include one or more of range, velocity and motion of the object.

7. The apparatus of claim 6, wherein the processing circuitry is configured to process the sensing measurements and use the features for at least one of presence detection and gesture classification.

8. The apparatus of claim 7, wherein the Sensing Measurement Setup Request frame received from the AP includes an unassociated station identifier (USID) or the STA assigned by the AP.

9. The apparatus of claim 1, wherein the memory is configured to store indications of the availability window.

10. The apparatus of claim 9, wherein the processing circuitry comprises a baseband processor.

11. A non-transitory computer-readable storage medium that stores instructions for execution by processing circuitry of a non-access point station (STA) configured to perform network (WLAN) sensing, wherein to participate in a sensing measurement setup initiated by an access point station (AP) that the STA is unassociated with, the processing circuitry is configured to:

encode a Sensing Measurement Setup Query frame for transmission to the AP, the Measurement Setup Query frame encoded to include an initiating station (ISTA) Availability Window Element, the ISTA Availability Window Element encoded to indicate an availability window of the STA for trigger-based (TB) sensing and a preferred periodicity;

decode a Sensing Measurement Setup Request frame received from the AP in response to the Sensing Measurement Setup Query frame;

wherein for the TB sensing, the Sensing Measurement Setup Request frame includes a responding station (RSTA) Availability Window Element that indicates a requested availability window, the requested availability window based on the availability window and the preferred periodicity indicated in the ISTA Availability Window Element of the Sensing Measurement Setup Query frame, the Sensing Measurement Setup Request frame further including a Sensing Measurement Parameters Element indicating requested sensing measurement setup parameters for a sensing measurement instance;

encode for transmission to the AP, a Sensing Measurement Setup Response frame in response to receipt of the Sensing Measurement Setup Request frame, the Sensing Measurement Setup Response frame encoded to indicate acceptance or rejection of the requested sensing measurement setup parameters in the Sensing Measurement Setup Request frame, wherein when the Sensing Measurement Setup Response frame is encoded to indicate rejection of the requested sensing measurement setup parameters, the processing circuitry is configured to encode the Sensing Measurement Setup Response frame to indicate preferred sensing measurement parameters;

perform sensing measurements during a TB sensing measurement instance based on the sensing measurement setup parameters, the TB sensing measurement instance occurring within the sensing availability window; and estimate features of an object in an area of interest based on the sensing measurements performed during the TB sensing measurement instance.

12. The non-transitory computer-readable storage medium of claim 11, wherein the processing circuitry is further configured to encode the Measurement Setup Query frame to include sensing capabilities of the STA.

13. The non-transitory computer-readable storage medium of claim 12, wherein processing circuitry is configured to encode the Sensing Measurement Setup Response frame to indicate rejection when the Sensing Measurement Setup Request frame did not indicate an availability window that overlaps the availability window of the STA signaled by the ISTA Availability Window Element.

14. The non-transitory computer-readable storage medium of claim 13, wherein the Sensing Measurement Setup Response frame is encoded to indicate rejection because the Sensing Measurement Setup Request frame did not indicate an availability window that overlaps the availability window of the STA signaled by the ISTA Availability Window Element, the processing circuitry is further configured to encode the Sensing Measurement Setup Response frame to include an Availability Window Element that indicates one or more other availability windows that can be assigned by the AP.

15. The non-transitory computer-readable storage medium of claim 14, wherein the TB sensing measurement instance includes one or more of a polling phase, NDPA sounding phase, Trigger frame (TF) sounding phase, and reporting phase.

16. The non-transitory computer-readable storage medium of claim 15, wherein the features include one or more of range, velocity and motion of the object.

17. The non-transitory computer-readable storage medium of claim 16, wherein the processing circuitry is configured to process the sensing measurements and use the features for at least one of presence detection and gesture classification.

18. An apparatus for an access point station (AP), the apparatus comprising:

processing circuitry; and memory, the AP configured to perform network (WLAN) sensing,

wherein to participate in a sensing measurement setup initiated by the AP with an unassociated non-AP station (STA), the processing circuitry is configured to:

decode a Sensing Measurement Setup Query frame received from the STA, the Measurement Setup Query frame including an initiating station (ISTA) Availability Window Element, the ISTA Availability Window Element indicating an availability window of the STA for trigger-based (TB) sensing and a preferred periodicity;

encode a Sensing Measurement Setup Request frame for transmission to the STA in response to the Sensing Measurement Setup Query frame;

wherein for the TB sensing, the Sensing Measurement Setup Request frame includes a responding station (RSTA) Availability Window Element that indicates a requested availability window, the requested availability window based on the availability window and the preferred periodicity indicated in the ISTA Availability Window Element of the Sensing Measurement Setup Query frame, the Sensing Measurement Setup Request frame further including a Sensing Measurement Parameters Element indicating requested sensing measurement setup parameters for a sensing measurement instance;

decode a Sensing Measurement Setup Response frame received from the STA in response to receipt of the Sensing Measurement Setup Request frame, the Sensing Measurement Setup Response frame encoded to indicate acceptance or rejection of the requested sensing measurement setup parameters in the Sensing Measurement Setup Request frame, wherein when the Sensing Measurement Setup Response frame is encoded to indicate rejection of the requested sensing measurement setup parameters, the Sensing Measurement Setup Response frame is encoded to indicate preferred sensing measurement parameters;

perform sensing measurements during a TB sensing measurement instance based on the sensing measurement setup parameters, the TB sensing measurement instance occurring within the sensing availability window; and estimate features of an object in an area of interest based on the sensing measurements performed during the TB sensing measurement instance.

19. The apparatus of claim 18, wherein the processing circuitry is further configured to decode the Measurement Setup Query frame to determine sensing capabilities of the STA.

20. The apparatus of claim 18, wherein when the Sensing Measurement Setup Response frame indicates rejection, the processing circuitry is configured to decode an Availability Window Element that indicates one or more other availability windows that can be assigned by the AP.

* * * * *